United States Patent Office 3,520,952
Patented July 21, 1970

3,520,952
RESISTANCE OF BLOCK COPOLYMERS HAVING A NONELASTIC BLOCK AND AN ELASTIC BLOCK TO DEGRADATION IN PHYSICAL PROPERTIES
Arthur C. Hecker, Forest Hills, and Charles Abramoff, Brooklyn, N.Y., assignors to Argus Chemical Corporation, Brooklyn, N.Y., a corporation of Delaware
No Drawing. Continuation-in-part of application Ser. No. 610,003, Jan. 18, 1967. This application July 17, 1967, Ser. No. 653,637
The portion of the term of the patent subsequent to Oct. 14, 1986, has been disclaimed
Int. Cl. C08f 29/12, 45/62
U.S. Cl. 260—878    15 Claims

ABSTRACT OF THE DISCLOSURE

Elastomeric block copolymers having an enhanced resistance to heat deterioration are provided by incorporating therein stabilizing combinations of alkyl polyphosphate salts and polyhydric polycyclic phenols.

---

This application is a continuation-in-part of copending application Ser. No. 610,003, filed Jan. 18, 1967, now U.S. Pat. 3,472,813.

This invention relates to compositions useful in improving the resistance of elastomeric block copolymers containing a non-elastomeric block which is a polymer of an α-olefin, such as an alkenyl cyclohydrocarbon, and an elastomeric block which is a polymer of a conjugated diolefin to degradation in physical properties upon exposure to heat at elevated temperatures, comprising a mixture of an alkyl polyphosphate salt and a polyhydric polycyclic phenol; to elastomeric block copolymer compositions having an enhanced resistance to heat deterioration due to incorporation therein of such compounds; and to a process of enhancing the resistance of such block copolymers to degradation in physical properties.

Thermoplastic rubbers which do not require vulcanization in order to obtain useful elastomeric properties are relatively new and have been well-received in the art. However, elastomers with acceptable physical properties are few and include the elastomeric vinyls, thermoplastic urethanes, and, to some extent, ethylene copolymers. U.S. Pat. No. 3,265,765 to Holden et al. dated Aug. 9, 1966 discloses another type of unvulcanized elastomer which comprises a block copolymer of monovinyl aromatic hydrocarbons and conjugated dienes. The Holden et al. block copolymers look, feel and act like rubber, yet they can be handled on standard thermoplastics processing equipment, and can be injection-molded, vacuum-formed, blow-molded, and extruded employing such equipment. These block copolymers offer good resilience, abrasion resistance, low water absorption, good resistance to aqueous solutions, including acids and bases, no rubbery odor, no plasticizer bleed out, and have excellent low temperature flexibility and electrical properties. For these reasons, these block co-polymers have found extensive use in rubber bands, toys and toy parts and sporting goods.

U.S. Pat. No. 3,299,174 to Kuhre et al., dated Jan. 17, 1967 discloses a hydrogenated block copolymer A–B–A based on 2–33% A units of polymerized vinylcyclo hydrocarbons having an average molecular weight between about 4000 and 115,000 and the remainder B units of a polymerized elastomeric block of conjugated diene hydrocarbons, the elastomeric block having an average molecular weight between about 20,000 and 450,000. At least 70% of the double bonds originally present in the copolymer are removed by hydrogenation.

U.S. Pat. No. 3,231,635 to Holden et al., dated Jan. 25, 1966, discloses a process for preparing the block copolymers disclosed in U.S. Pat. No. 3,265,765 discussed hereinbefore. The Holden et al. process is a sequential process for the production of a block copolymer which can be represented as A–B–A and B–A–B, where A and B are polymer blocks of the alkenyl substituted aromatic hydrocarbon and conjugated dienes, respectively. The catalyst employed in this process comprises an alkyl lithium catalyst having at least two alkyl substituents on the carbon atom to which the lithium is directly attached.

Canadian Pat. No. 750,466, dated Jan. 10, 1967, and based on U.S. application Ser. No. 280,712, filed May 15, 1963 by Milkovich, discloses elastomeric block copolymers which have excellent rubber properties without vulcanization and which comprise balanced terminal polymer blocks having plastic-like characteristics, that is, a glass transition temperature above about 25° C. and a center elastomeric section comprising two substantially equal elastomeric polymer blocks coupled with a divalent hydrocarbon unit having from 1 to 10 carbon atoms. The Milkovich block copolymers have the general configuration A–B–C–B–A wherein the A's are polymer blocks of alkenyl arenes, the B's are polymer blocks of conjugated dienes and C is the coupling divalent hydrocarbon radical. A lithium hydrocarbon catalyst is employed in preparing these block copolymers.

Unfortunately, industrial applications of the elastomeric unvulcanized block copolymers have been limited because of the thermal qualities of the block copolymer. Thus, for example, where the block copolymers, for example, styrene and butadiene, are subjected to elevated temperatures, that is at temperatures sufficiently high to flux them, and especially at temperatures in excess of about 300° F. the polymers become resinified and develop a crazed skin on their surface in a matter of fifteen to thirty minutes, which substantially reduces their flexibility. This, of course, leaves the polymer in an undesirable state. Thus, in order to aovid problems stemming from the poor thermal qualities of these block copolymers, Shell Chemical Company recommends that these polymers should not be employed in applications requiring elevated surface temperatures of higher than 150° F. for any length of time. See Shell Technical Bulletins SC:65–169; SC:66–171; SC:66–176; and SC:66–177.

It is known to employ phenols and/or alkyl polyphosphates salts as stabilizers for certain plastics.

For example, U.S. Pat. No. 3,244,668 to Knapp et al., dated Apr. 5, 1966, relates to the stabilization of plastics including styrene homopolymers and copolymers, such as polystyrene, and styrene-acrylonitrile copolymer; rubbery homopolymers of conjugated dienes; and rubbery copolymers of a conjugated diene and mono-olefinic compound, employing a stabilizer system based on a combination of a monocyclic hindered phenol of the type:

(I) 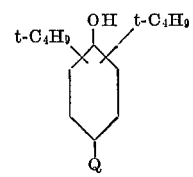

where Q is the aldehyde group (CHO) or the nitro group ($NO_2$); or a side-chained-substituted cinnamic acid derivative of the type:

(II) 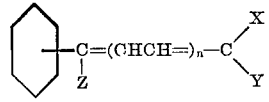

wherein Z is hydrogen, or an alkyl, aryl or aralkyl radical, X is a cyano, nitro, difluoromethyl, trifluoromethyl radical, or $CON(R)_2$, $COOR$ or $COR$. Y is hydrogen or any one of X; or a monocyclic phenol of the type:

(III)

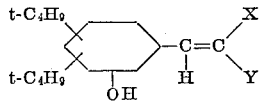

wherein X is a cyano or nitro radical, or $CON(R)_2$, $COOR$, or $COR$ and Y is hydrogen or any one of X. Knapp et al. indicate that among the stablizers that can be employed in addition to the monocyclic phenols and cinnamic acid derivatives are salts of polyphosphoric acid partial esters.

The copolymers disclosed in Knapp et al. are random copolymers. Elastomeric block copolymers of an α-olefin, such as alkenyl cyclohydrocarbon and a conjugated diene, are not disclosed.

U.S. Pat. No. 2,499,503 to Huff et al., dated Mar. 7, 1950, shows that the alkali metal penta-alkyl tripolyphosphates, such as pentasodium penta 2-ethylhexyl tripolyphosphate, members of the class mentioned by Knapp et al., are stabiilzers for polyvinyl chloride resins.

In accordance with the instant invention, a stabilizer system for block copolymers containing a non-elastomeric block which is a polymer of an α-olefin, such as an alkenyl cyclohydrocarbon having a molecular weight within the range from about 2,000 to about 1115,000, and an elastomeric block which is a polymer of a conjugated diene having a molecular weight within the range from about 20,000 to about 1,000,000, is provided which enhances the resistance of such block copolymers to deterioration in physical properties due to exposure to elevated temperatures. This combination consists essentially of an alkyl polyphosphonate salt and a polyhydric polycyclic phenol. The polyhydric polycyclic phenol alone imparts no or only a limited resistance to deterioration in physical properties upon exposure to elevated temperatures, no better than that imparted by the monocyclic hindered phenols taught by Knapp in U.S. Pat. No. 3,244,668. The polyphosphonate alone also imparts to the block copolymer only limited resistance to deterioration in physical properties and to discoloration upon exposure to elevated temperatures. However, when the polyphosphonate is used together with the polyhydric polycyclic phenol in the block copolymers, the combination displays a surprising stabilizing action against degradation in physical properties, as well as against discoloration, indicating that each synergizes the stabilizing action of the other in this environment.

In addition, in accordance with the instant invention, block copolymer compositions having an improved resistance to deterioration in physical properties due to exposure to elevated temperatures are provided, consisting essentially of block copolymers containing a non-elastomeric block of a polymer of an α-olefin, such as a alkenyl cyclohydrocarbon and an elastomeric block of a polymer of a conjugated diene, and containing as a stabilizer therefor an alkyl polyphosphate salt, and a polyhydric polycyclic phenol.

Further in accordance with the instant invention, a process for enhancing the resistance of the above block copolymers to deterioration in physical properties upon exposure to elevated temperatures is provided, which comprises incorporating in the block copolymers an alkyl polyphosphate salt and a polyhydric polycyclic phenol.

The alkyl polyphosphate salts in accordance with the invention are defined by the following formula:

(I) $\quad M_nR_m(P_xO_{3x+1})_z$ wherein M is a monovalent or bivalent metal cation or an ammonium, quaternary ammonium or organic amine cation; R is an alkyl radical having from one to about twenty-four carbon atoms; x is an integer from 2 to 4, representing the number of phosphorus atoms; n is an integer representing the number of M atoms, m is an integer representing the number of R groups, and z is an integer representing the number of $(P_xO_{3x+1})$ radicals, and is determined according to the valance of M. Accordingly, n is an integer within the range from 1 to $$\frac{z(\text{valence of } P_xO_{3x+1}) - m}{\text{valence of M}}$$

m is an integer within the range from 1 to $$z(\text{valence of } P_xO_{3x+1}) - n(\text{valence of M})$$

and z is an integer within the range from 1 to $$\frac{n(\text{valence of metal}) + m}{\text{valence of polyphosphate group}}$$

This group encompasses three principal subgenera of organometallic polyphosphates, the pyrophosphates, tripolyphosphates and tetrapolyphosphates.

Where M is monovalent, these polyphosphates take the following form:

PYROPHOSPHATES—(II) $M_nR_{4-n}P_2O_7$ (A) $MR_3P_2O_7$
(B) $M_2R_2P_2O_7$
(C) $M_3RP_2O_7$

TRIPOLYPHOSPHATES—(III) $M_nR_{5-n}P_3O_{10}$ (A) $MR_4P_3O_{10}$
(B) $M_2R_3P_3O_{10}$
(C) $M_3R_2P_3O_{10}$
(D) $M_4RP_3O_{10}$
(E) $M_5R_5(P_3O_{10})_2$

TETRAPOLYPHOSPHATES—(IV) $M_nR_{6-n}P_4O_{13}$ (A) $MR_5P_4O_{13}$
(B) $M_2R_4P_4O_{13}$
(C) $M_3R_3P_4O_{13}$
(D) $M_4R_2P_4O_{13}$
(E) $M_5RP_4O_{13}$

Where M is bivalent, these polyphosphates take the following form:

PYROPHOSPHATES—(V) $M_nR_{8-2n}(P_2O_7)_2$ (A) $M_3R_2(P_2O_7)_2$
(B) $M_2R_4(P_2O_7)_2$
(C) $MR_6(P_2O_7)_2$

TRIPOLYPHOSPHATES—(VI) $M_nR_{10-2n}(P_3O_{10})_2$ (A) $M_4R_2(P_3O_{10})_2$
(B) $M_3R_4(P_3O_{10})_2$
(C) $M_2R_6(P_3O_{10})_2$
(D) $MR_8(P_3O_{10})_2$

TETRAPOLYPHOSPHATES—(VII) $M_nR_{12-2n}(P_4O_{13})_2$ (A) $M_5R_2(P_4O_{13})_2$
(B) $M_4R_4(P_4O_{13})_2$
(C) $M_3R_6(P_4O_{13})_2$
(D) $M_2R_2(P_4O_{13})_2$
(E) $MR_{10}(P_4O_{13})_2$

M, R and n as used in the above formulae are the same as defined hereinbefore.

Typical metal cations (M) are, for example, sodium, potassium, lithium, barium, magnesium, strontium, calcium, tin, zinc, cadmium and nickel, and in addition, ammonium as well as organic amines, such as tri(tert-butyl) amine, triethanolamine, diethanolamine, monoethanolamine, and quaternary bases such as tetramethyl ammonium hydroxide, and tetraethyl ammonium hydroxide.

Typical alkyl radicals (R) are, for example, methyl, ethyl, propyl, isopropyl, butyl, isobutyl, sec-butyl, t-butyl, amyl, isoamyl, capryl, hexyl, heptyl, n-octyl, isooctyl, t-octyl, 2-ethylhexyl, nonyl, decyl, isodecyl, undecyl, dodecyl, stearyl, palmityl, myristyl, and behenyl.

As exemplary of the polyphosphates which can be used, in addition to those given in the examples which follow, there can be mentioned pyrophosphates such as methyl trisodium pyrophosphate, diethyl diammonium pyrophosphate, butyl triammonium pyrophosphate, diisoamyl dipotassium pyrophosphate, dicapryl dilithium pyrophosphate, dipropyl cadmium pyrophosphate, di-2-ethylhexyl barium pyrophosphate, tetralauryl dizinc dipyrophosphate, and hexastearyl calcium dipyrophosphate; tripolyphosphates such as triethyl diammonium tripolyphasphate, t-butyl tetrapotassium tripolyphosphate, tetra-2-ethylhexyl sodium tripolyphosphate, dicapryl tri-triethanolamino tripolyphosphate, tridecyl disodium tripolyphosphate, tetrastearyl sodium tripolyphosphate, isoamyl tetrasodium tripolyphosphate, dioctyl tripotassium tripolyphosphate, tricapryl dipotassium tripolyphosphate, tri-2-ethylhexyl dimonoethanolamino tripolyphosphate, tri-2-ethylhexyl barium tripolyphosphate, tri-2-ethylhexyl nickel tripolyphosphate, and tetra-2-ethylhexyl trizinc di-(tripolyphosphate); and tetrapolyphosphates such as triethyl triammonium tetrapolyphosphate, triethyl tripotassium tetrapolyphosphate, diiso-amyl tetrasodium tetrapolyphosphate, tetraoctyl dipotassium tetrapolyphosphate, monocapryl tetrasodium tetrapolyphosphate, hexaethyl tricadmium di-tetrapolyphosphate, tetra-2-ethylhexyl tetrabarium di-tetrapolyphosphate, decastearyl calcium di-tetrapolyphosphate, decanonyl strontium di-tetraphosphate, hexalauryl trinickel di-tetrapolyphosphate, and hexadodecyl trizinc di-tetrapolyphosphate.

The alkyl polyphosphate salt employed in the instant invention can be prepared by reacting in the presence of water phosphorus pentoxide, the desired aliphatic alcohol, and the desired metal oxide or hydroxide.

The following examples are illustrative of the preparation of several alkyl polyphosphates which can be employed in the instant invention.

Example A

Deca - 2 - ethylhexyl penta-cadmium tetra-tripolyphosphate was prepared as follows:

2-ethylhexanol (32.5 g., 0.25 mole) was added dropwise to phosphorus pentoxide (21.25 g., 0.15 mole, weighed under benzene) with stirring. The temperature of the mixture rose to 86° C. Thereafter, cadmium oxide (16 g., 0.125 mole) and 10 ml. water were added to this mixture during a 45 minute period.

The product formed was a white soapy mass which was dried on a steam bath for 8 hours and in a vacuum oven at a temperature of 60 to 80° C. for 14 hours. The dry product was a hard white solid which upon titration with ethylene diamine tetraacetic acid was found to contain 20.5% cadmium, which is the theoretical amount of cadmium contained in $Cd_5(C_8H_{17})_{10}(P_3O_{10})_4$.

Example B

Deca-2-ethylhexyl penta-barium tetra-tripolyphosphate was prepared as follows:

2-ethylhexanol (32.5 g., 0.25 mole) was added dropwise with stirring to phosphorus pentoxide (21.25 g., 0.15 mole). The temperature of this mixture rose to about 86° C. Thereafter, barium hydroxide octahydrate (39.4 g., 0.125 mole) and 10 ml. water were added to this mixture during a 45 minute period.

The product obtained was a white soapy mass which was dried on a steam bath for 8 hours and then in a vacuum oven for 14 hours at a temperature of 60 to 80° C. The dry product obtained was a hard white solid which upon being titrated with perchloric acid in glacial acetic acid to a crystal violet end point was found to contain 27.25% barium. The theoretical amount of barium contained in $Ba_5(C_8H_{17})_{10}(P_3O_{10})_4$ is 25.15%.

Example C

Pentastearyl penta-sodium di-tripolyphosphate was prepared as follows:

Phosphorus pentoxide (85 g., 0.6 mole weighed under benzene) was poured into a two liter 4-neck flask fitted with a heavy duty stirring motor. A mixture of alcohols (269 g.) containing a major portion of stearyl alcohol and having the following composition: 62.04%

$C_{19}H_{37}OH$ 35.6% $C_{16}H_{33}OH$, 1.9% $C_{14}H_{29}OH$ and 0.1% $C_{12}H_{25}OH$, dissolved in benzene, was added dropwise to the phosphorus pentoxide with high speed agitation. Thereafter, sodium hydroxide (40 g., 1.0 mole) dissolved in water (100 cc.) was added dropwise to the mixture of alcohol and phosphorus pentoxide.

The fluid product was poured into a stainless steel tray and evaporated on a steam bath, and then dried in a vacuum oven for 6 hours at a temperature of 70 to 85° C.

The final product was an easily crushed white solid which was insoluble in water and which melted over a broad range and completely melted at 175° C. The actual yield of the product was about 379 g., which was 95.6% of the theoretical yield of pentastearyl penta-sodium di-tripolyphosphate which is 397 g.

Example D

Penta-iso-tridecyl penta-sodium di - tripolyphosphate was prepared as follows:

Phosphorus pentoxide (85 g., 0.6 mole weighed under benzene) was added to a two liter 4-neck flask fitted with a heavy duty stirring motor. Iso-tridecyl alcohol (200 g.) dissolved in benzene was then added dropwise to the phosphorus pentoxide with high speed agitation. Sodium hydroxide (40 g., 1.0 mole) dissolved in water (100 cc.) was added dropwise to the mixture of the iso-tridecyl alcohol and phosphorus pentoxide.

The fluid product was dried in a vacuum oven for 6 hours at 90° C. The dry product was a waxy white solid which was soluble in water. The actual yield of the product was 91.8% of that theoretically expected for penta-iso-tridecyl penta-sodium di-tripolyphosphate.

Example E (a) Penta-2-ethylhexyl penta-sodium di - tripolyphosphate was prepared as follows:

Phosphorus pentoxide (42.5 g., 0.3 mole weighed under benzene) was added to a stirred mixture of 2-ethyl-hexanol (65 g., 0.5 mole) and sodium hydroxide (20 g., 0.5 mole) and water (20 g.). The temperature of this mixture rose from room temperature to 98° C. The product was dried in a vacuum oven for 6 hours at 90° C., resulting a pasty solid which retained water and had a solids content of 81%. The sodium content of the 81% paste was found to be 5.61%. The theoretical amount of sodium contained in penta 2-ethylhexyl penta-sodium di-tripolyphosphite in an 81% paste is 6.94%.

(b) Pentasodium penta - 2-ethylhexyl di(tripolyphosphate) was prepared in an alternate procedure as follows.

2-ethylhexanol (65 g.) was added during a 15 minute period to a stirred mixture of phosphorus pentoxide (42.5 g.) and hexane (100 ml.) in a 500 ml. tall form beaker. The temperature of the mixture rose to 72° C. Thereafter, sodium hydroxide (20 g.) in water (20 ml.) was slowly added to the mixture with stirring. The beaker containing the mixture was then heated for four hours on a steam bath and the mixture was dried in a vacuum oven at 82° C. for 8 hours.

The product obtained was a white rubbery solid which upon being titated with perchloric acid was found to contain 8.56% sodium. The theoretical amount of sodium contained in penta-2-ethylhexyl penta-sodium di-tripolyphosphate is 9.79% sodium.

The polyhydric polycyclic phenols include aromatic nuclei which are linked by a polyvalent linking radical and are defined by the formula:

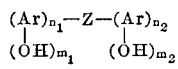

wherein Z is a polyvalent linking group selected from the group consisting of oxygen; sulfur; aliphatic, cycloaliphatic, and aromatic hydrocarbons; oxyhydrocarbon; trihydrocarbon; heterocyclic; carbonyl; sulfinyl; and sulfonyl groups, and has up to twenty carbon atoms.

Ar is a phenolic nucleus which can be a phenyl or a polycarbocylic group having condensed or separate phenyl rings; each Ar group contains at least one free phenolic hydroxyl group up to a total of four ($m_1$ and $m_2=1$ to 4), and $n_1$ and $n_2$ are numbers, one or greater, and preferably from one to four. The Ar rings can also include additional rings connected by a bivalent linking nucleus of the type Z, for example, Ar–Z–Ar–Z–Ar.

The aromatic nucleus Ar can, in addition to phenolic hydroxyl groups, include one or more inert substituents. Examples of such inert substituents include hydrogen, halogen atoms, e.g. chlorine, bromine and fluorine; organic radicals containing from one to about thirty carbon atoms, such as alkyl, aryl, alkenyl, alkaryl, aralkyl, cycloalkenyl, cycloalkyl, alkoxy, aryloxy, acyl and acyloxy (R'C—O)
              ‖
              O where R' is aryl, alkyl or cycloalkyl, or thio-hydrocarbon groups having from one to about thirty carbon atoms. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluorenyl groups.

The simplest form of polyhydric polycyclic phenol has the structure:

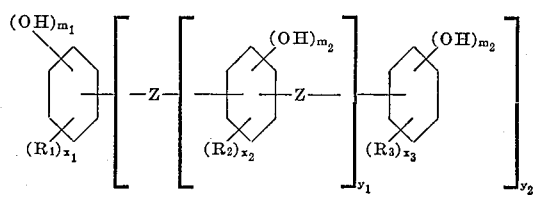

wherein $R_1$, $R_2$ and $R_3$ are inert substituent groups as set forth above, $m_1$ and $m_3$ are integers from one to a maximum of five, $m_2$ is an integer from one to a maximum of four, $x_1$ and $x_3$ are integers from zero to four, and $x_2$ is an integer from zero to three; $y_1$ can be an integer from zero to about six and $y_2$ can be an integer from one to five, preferably one or two.

Preferably, the hydroxyl groups are located ortho and/or para to Z, and there is only one hydroxyl group per phenyl nucleus.

Exemplary Z groups are alkylene, alkylidene, alkenylene, arylalkylene, aralkylidene, cycloalkylene and cycloalkylidene, and oxa- and thia-substituted such groups, carbonyl groups, tetrahydrofuranes, esters and triazino groups. The Z groups are usually bi-, tri-, or tetravalent, connecting two, three or four Ar groups. However, higher valence Z groups, connecting more than four Ar groups, can also be used. According to their constitution the Z groups can be assigned to subgenera as follows:

(1) Z groups wherein a single carbon atom carrying at least one hydrogen links two Ar nuclei, such as

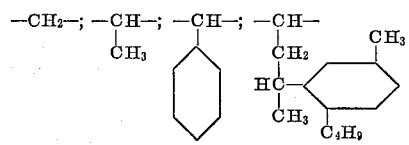

and

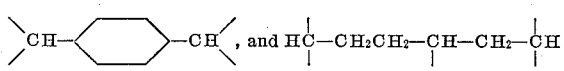

(2) Z groups wherein the aromatic nuclei are linked by a single carbon carrying only substituents other than hypdrogen, such as

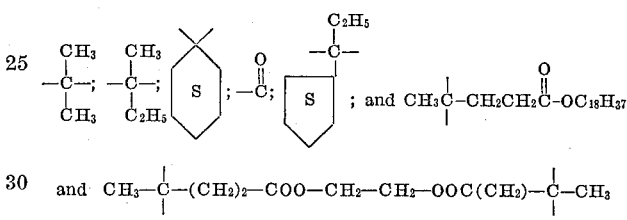

(3) Z groups comprising only hydrocarbon groups where at least two carbons separate the aromatic groups, such as

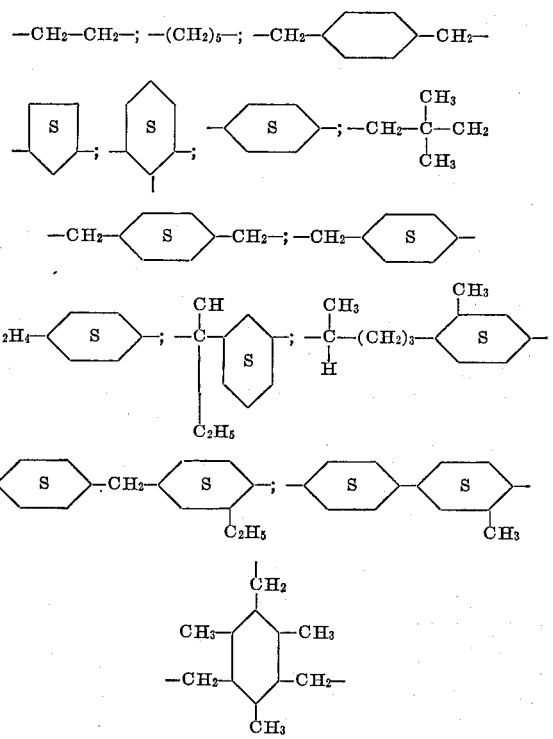

(4) Z groups where only atoms other than carbon link the aromatic rings, such as

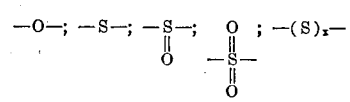

(5) Z groups having both carbon and other atoms linking the aromatic nuclei, such as:

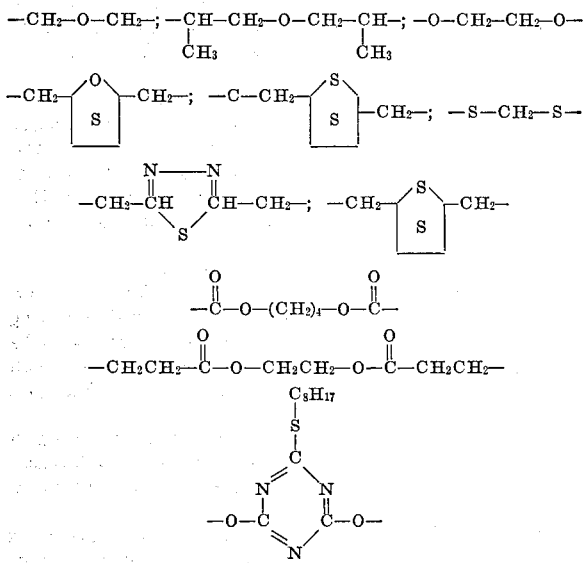

Although the relation of effectiveness to chemical structure is insufficiently understood, many of the most effective phenols have Z groups of subgenus 3, and accordingly this is preferred.

Exemplary polyhydric polycyclic phenols used in accordance with the instant invention are 4,4'-methylenebis-(2-tertiary-butyl-5-methyl-phenol),
2,2'-bis(4-hydroxyphenyl) propane,
methylenebis-(p-cresol),
4,4'-oxobis-phenol,
4,4'-oxobis(3-methyl-5-isopropyl-phenol),
4,4'-oxobis(3-methyl-phenol),
2,2'-oxobis(4-dodecyl-phenol),
2,2'-oxobis(4-methyl-5-tertiary-butyl-phenol),
4,4'-n-butylidenebis-(2-t-butyl-5-methyl-phenol),
2,2'-methylene-bis-[4-methyl-6,(1'-methyl-cyclohexyl)-phenol],
4,4'-cyclohexylidenebis(2-tertiary-butyl-phenol),
2,6-bis-(2'-hydroxy-3'-t-butyl-5'-methyl-benzyl-4-methyl-phenol,
4,4'-oxobis(naphthalene-1,5-diol),
1,2'-methylenebis(naphthalene-1,8-diol),
1,3'-bis(naphthalene-2,5-diol)propane, and
2,2'-butylidenebis(naphthalene-2,7-diol),
di(hydroxyphenyl)ketone,
(3-methyl-5-tert-butyl-4-hydroxyphenyl)-(4'-hydroxyphenyl)methane,
2,2'-methylenebis(4-methyl-5-isopropylphenol),
2,2'-methylenebis(5-tert-butyl-4-chlorophenol),
(3,5-di-tert-butyl-4-hydroxyphenyl)-(4'-hydroxyphenyl)methane,
(2-hydroxyphenyl)-(3',5'-di-tert-butyl-4'-hydroxyphenyl)methane,
2,2'-ethylidenebis(4-octylphenol),
4,4'-isopropylidenebis(2-tert-butyl-phenol),
2,2'-isobutylidenebis-(4-nonylphenol),
2,4-bis(4-hydroxy-3-t-butylphenoxy)-6-(n-octylthio)-1,3,5-triazine,
2,4,6-tris(4-hydroxy-3-t-butylphenoxy)-1,3,5-triazine,
2,2'-bis-(3-t-butyl-4-hydroxyphenyl)thiazolo-5,4-d)-thiazole,
2,2'-bis(3-methyl-5-t-butyl-4-hydroxyphenyl)-thiazolo-(5,4-d)-thiazole,
4,4'-bis(4-hydroxyphenyl)pentanoic acid octadecyl ester,
cyclopentylidene 4,4'-bisphenol,
2-ethylbutylidene 4,4'-bisphenol,
4,4'-cyclooctylidenebis(2-cyclohexylphenol),
β,β-thiodiethanolbis(3-tert-butyl-4-hydroxyphenoxy acetate),
1,4-butanediolbis(3-tert-butyl-4-hydroxyphenoxy acetate),
pentaerylthritoltetra(4-hydroxyphenol propionate),
2,4,4'-trihydroxybenzophenone,
bis(2-tert-butyl-3-hydroxy-5-methylphenyl)sulfide,
bis(2-tert-butyl-4-hydroxy-5-methylphenyl)sulfide,
bis(2-tert-butyl-4-hydroxy-5-methylphenyl) sulfoxide,
bis(3-methyl-5-tert-butyl-4-hydroxy benzyl) sulfide,
bis(2-hydroxy-4-methyl-6-tert-butyl phenyl sulfide,
4,4'-bis(4-hydroxyphenyl) pentanoic acid octadecyl thiopropionate ester,
1,1,3-tris(2'-methyl-4'-hydroxy-5'-tert-butylphenyl butane,
1,1,3-tris(1-methyl-3-hydroxy-4-tert-butylphenyl) butane.
1,8-bis(2-hydroxy-5-methylbenzoyl)-n-octane,
2,2'-methylene-bis-[4'-(3-tert-butyl-4-hydroxyphenyl)-thiazole],
2,2'-(2-butene)bis-(4-methoxy-6-tert-butyl phenol).

The polyhydric polycyclic phenols used in the invention can also include condensation products of phenol or alkyl phenols with aldehydes, for example, formaldehyde, acetaldehyde, and propionaldehyde, or with ketones, for example, acetone.

The polyhydric polycyclic phenols used in the invention can also be condensation products of phenol or alkylphenols with hydrocarbons having a bicyclic ring structure and a double bond or two or more double bonds, such as α-pinene, β-pinene, dipentene, limonene, vinylcyclohexene, dicyclopentadiene, alloocimene, isoprene, and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Z group linking the phenolic nuclei all falls into the preferred subgenus 3. For methods of preparation see e.g. U.S. Pat. No. 3,124,555, U.S. Pat. No. 3,242,135, British Pat. No. 961,504.

A sufficient amount of the stabilizer combination of the invention is used to enhance the resistance of the block copolymer against degradation in physical properties upon exposure to elevated temperatures. Small amounts are usually adequate. Amounts within the range from about 0.1 to about 10% total stabilizers by weight of the block copolymer are satisfactory. Preferably, from about 0.25 to about 2% is employed for optimum stabilization. Amounts of the polyphosphate within the range from about 0.05 to about 5% by weight of the block copolymer and amounts of the polyhydric polycyclic phenol within the range from about 0.05 to about 5% by weight of the block copolymer are satisfactory. Preferably from about 0.25 to about 2% of the polyphosphate and from about 0.25% to 2% of the polyhydric polycyclic phenol are employed, for optimum enhancement of resistance of degradation in physical properties.

A mixture of the alkyl polyphosphate salt and polyhydric polycyclic phenol for incorporation into the block copolymer can be formed by simply mixing the individual ingredients in the dry state or in a suitable liquid medium. It is frequently helpful to combine the phenol with the freshly prepared polyphosphate salt in the presence of the solvent and water in which the salt has been prepared before the solvent and water are finally removed. Another helpful expedient is to prepare the stabilizer composition in the form of an aqueous emulsion. Such an emulsion can be added to a freshly made block copolymer latex before the polymer is isolated from the latex by the usual procedures of coagulation or spray-drying. A "masterbatch" technique can be utilized to provide both wet and dry combinations of the stabilizer composition with the block copolymer in proportions for compounding into larger quantities of polymer to be stabilized.

In addition to the polyphosphate and phenol, other thermal antioxidants and light stabilizers can be employed in the compositions of the present invention, such as organic phosphites as set out in U.S. Pat. No. 3,244,650 to Hecker et al., dated Apr. 5, 1966, and esters of thiodipropionic acid as set out in U.S. Pat. No. 3,255,136 to Hecker et al., dated June 7, 1966.

The block copolymers can be blended with additives such as fillers, pigments and lubricants. Appropriate pigments and fillers are, for example, flour, cotton, shredded or chopped cloth, talc, chopped canvas, paper pulp forms, asbestos, powdered mica, calcium carbonate, carbon, graphite, quartz, diatomaceous silica, fibrous glass, barytes, calcium silicate, iron, barium sulfate, litharge, clay and titanium dioxide. Fllers can be used in an amount of from about 2 to about 40% by weight of the polymer. Typical lubricants are mineral oil, natural and synthetic waxes, fatty acids such as stearic acid, alkaline earth and heavy metal stearates, and aliphatic alcohols, ketones, esters and epoxides having from about 16 to about 60 carbon atoms in the molecule, including stearyl alcohol, palmitone, behenone, oleone, cetyl palmitate, 1,2-epoxydocosane, and isooctyl epoxystearate, in amounts of from about 0.2 to 3% of the polymer.

The term "block copolymers" as employed herein refers to polymeric chains containing alternating blocks of homopolymers or of copolymers, each block differing materially from the next adjacent block, and which block copolymers can be processed in thermoplastic resin equipment without the use of vulcanizers. The block copolymers that can be stabilized in accordance with the instant invention have excellent rubber properties, with or without vulcanization. Examples of such block copolymers are set out in U.S. Pat. No. 3,265,765 to Holden et al., discussed hereinbefore, and can have the general formula A–B–A, wherein each A or end block is an independently selected non-elastomeric polymer block which is a polymer of an α-olefin, preferably an alkenyl cyclohydrocarbon, which include both the unhydrogenated and hydrogenated α-aromatic olefins, having an average molecular weight of from about 2000 to about 115,000 and preferably from about 5000 to about 50,000, and a glass transition temperature above about 25° C., and preferably above about 50° C., and B is an elastomeric polymer block which is a polymer of a conjugated diolefin having an average molecular weight of from about 20,000 to about 1,000,000, and preferably between about 50,000 and about 500,000, and a glass transition temperature below about 10° C., and can have a cis-1,4-content of from about 80 to about 100%, such as polyisoprene. The difference between the glass transition temperature of the end blocks A and the center block B should be at least 40° C., and preferably at least 100° C. The end blocks A in preferred polymers constitute from about 10 to about 50% of the total polymer weight.

Block copolymers stabilized in accordance with the instant invention can include a special variety of polymers having the general formula A–C–A, wherein each A is as defined hereinbefore, and C is an elastomeric polymer block having an average molecular weight of from about 20,000 to about 1,000,000, and containing an increasing ratio from one end to the other of the block of units of the monomer of blocks A, and having a glass transition temperature below 10° C. Thus, C can be represented by the formula:

wherein $m$ and $n$ are integers such that C contains from 5 to 50% by weight of blocks A, and 95 to 50% by weight of blocks B. These special kinds of polymers

are referred to as "tapered blocks" and are described in detail in U.S. Pat. No. 3,265,765, discussed hereinbefore.

Block copolymers, e.g. of the A–B–A variety, which have been hydrogenated to reduce their unsaturation can also be stabilized in accordance with the instant invention. Such a block copolymer is described in U.S. Pat. No. 3,299,174 to Kuhre et al.

In addition, block copolymers, for example, of the A–B–A or B–A–B variety, prepared by a sequential block polymerization technique employing alkyl lithium catalysts can also be stabilized in accordance with the instant invention. Such block copolymers are described in U.S. Pat. No. 3,231,635 to Holden et al., described hereinbefore.

Block copolymers having the general configuration A–B–C–B–A wherein C is a coupling divalent hydrocarbon radical which is a dihalo alkane, preferably having from 1 to 10 carbon atoms per molecule, can also be stabilized in accordance with the instant invention. Such a block copolymer is described in Canadian Pat. No. 750,466, discussed hereinbefore.

In addition, any of the block copolymers disclosed in U.S. Pat. No. 3,251,905, dated May 17, 1966, to Zelinski, can also be stabilized in accordance with the instant invention.

Mixtures of the above described block copolymers with other compatible polymers, for example, a non-elastomeric homopolymer, such as any of the polymers of the monomers of block A set out hereinafter or with 1,4-polybutadiene or polyisoprene or with polyvinyl halides, such as polyvinyl chloride or with polyolefins such as polypropylene or polyethylene or with any synthetic rubber including elastomeric homopolymers, and random copolymers of the monomers, can also be stabilized.

Particularly useful polymers which can be stabilized in accordance with the invention are blends of block copolymers and synthetic rubbers containing from about 5 to about 50% of the block copolymer; and mixtures of an elastomeric polymer of conjugated dienes, e.g., polyisoprene having a cis-1,4-content of from 88 to 100%, from about 5 to about 30% by weight of a block copolymer having the A–B–A structure, from about 5 to about 50% by weight of a polymerized conjugated diene having a cis-1,4-content of from 88 to 100% and a relatively low average molecular weight of the order of from about 2,000 to about 50,000.

All of the above-mentioned block copolymers whether in their vulcanized or unvulcanized forms can be stabilized in accordance with the instant invention.

In the above block copolymers, the elastomeric section B can be a polymer block of essentially any synthetic elastomer, preferably a polymer or copolymer of an aliphatic conjugated diene, such as isoprene, methyl isoprene, butadiene, copolymers of the styrene-butadiene type, and butadiene-acrylonitrile.

The non-elastomeric blocks A, in addition to being styrene polymer blocks, can comprise polymer blocks of the lower olefins, such as ethylene, propylene, isobutene, or 4-methylpentene-1, as well as methylstyrene, acrylonitrile, chlorostyrene and methylmethacrylate. The vinyl aromatic polymer blocks are preferably made from one or more monovinyl aromatic hydrocarbons of the benzene series such as styrene, vinyl toluene, vinyl xylene, ethylvinyl benzene, isopropyl styrene, ethylvinyl toluene, tertiary-butyl styrene, diethyl styrene, stilbene, vinyl cyclopentene, and vinyl naphthalene. Vinyl aromatic copolymers should contain at least 70% by weight of one or more of such monovinyl aromatic hydrocarbons and not more than 30% by weight of alpha-methyl styrene or esters of acrylic or methacrylic acid such as ethylacrylate, butylacrylate or methylmethacrylate.

The coupling units C contained in the block copolymers of Canadian Pat. No. 750,466 can be a dihalohydrocarbon, and preferably a dihaloalkane, such as dibromomethane, dibromoethane, dibromopropane, dibromobutane, dibromopentane, dibromohexane, and the corresponding dichloro compounds as well as the bromochloro alkanes corresponding to these.

The elastomeric character of the block copolymers are determined by the ratio of the several monomers employed in forming the same.

The aforementioned block copolymers can be prepared employing conventional polymerization techniques, such as set out in U.S. Pat. Nos. 3,231,635; 3,299,174 and Canadian Pat. No. 750,466, all of which were discussed hereinbefore.

Examples of block copolymers commercially available include styrene-butadiene block copolymers manufactured by Shell Chemical Company and sold under the registered trademarks Thermolastics 125, 226, 200, 201, and 202, which have the physical properties set out in Table I.

to form stabilizer combinations. The stabilizers were dispersed in the unstabilized block copolymer on a two-roll laboratory mill, and fluxed at a temperature of 280 to 300° F. for two to three minutes. The milled sheets were smooth and had dull surfaces. The sheets were then tested for resistance to deterioration when heated, i.e. the time required to form a resinified and crazed skin on the surface of a sample as a result of oxidative deterioration. The block copolymer strips cut from the milled sheets were heated in a circulating air oven at temperatures of 350° F. or 375° F. for two hours. Samples were withdrawn at 15 minute intervals, and examined for resinification.

TABLE I

| | Thermolastic | | | | |
|---|---|---|---|---|---|
| | 125 | 226 | 200 | 201 | 202 |
| Processing Technique | Extrusion | Injection molding | Inj. mold. extrusion vacuum forming blow mold | Injection molding | Injection molding |
| Specific gravity | 0.94 | 0.99 | 1.01 | 1.02 | 1.03 |
| 300% modulus, p.s.i. | 150 | 275 | 500 | 1,100 | 550 |
| Tensile strength | 3,000 | 650 | 1,800 | 1,600 | 850 |
| Elongation, percent | 1,100 | 740 | 800 | 500 | 500 |
| Low temperature flexibility, ° F. to Young's modulus of 10,000 p.s.i. | −75 | −55 | −75 | −60 | −75 |
| Melt index: | | | | | |
| Condition E, gms./10 min | | 20 | | | 13 |
| Condition G, gms./10 min | 10 | | 6.5 | 15 | |

NOTE.—Physical appearance: Easy-to-process pellets.

The combination of stabilizers of the invention can be formulated as a simple mixture, for incorporation in the block copolymer by the polymer manufacturer or by the converter. An inert organic solvent such as xylene, cyclohexanone, ethyl benzene and the like can be used to facilitate handling, if the ingredients do not form a homogeneous mixture or solution. Such a stabilizer combination is incorporated in the block copolymer in suitable mixing equipment, such as a mill, a Banbury mixer, an extruder, and the like. The stabilizers can also be incorporated separately in the polymer, such as by adding them directly to the polymer on the mill or in the extruder or mixer.

The stabilized block copolymer can be worked into any desired shape, such as by milling, calendering, extrusion, extrusion or injection molding, or fiber forming.

The following examples in the opinion of the inventors represent the best embodiments of their invention.

The block copolymers used in the Examples were block copolymers of styrene and butadiene and sold under the registered trademarks Thermolastics 125, 201, 202 and 226 and produced by the Shell Chemical Company. The properties of these block copolymers are set out in Table I hereinbefore.

The stabilizers tested were weighed and where more than one stabilizer was employed were mixed together Example 1

The two-component stabilizer systems of the invention were evaluated against the stabilizing effect of each component thereof, taken singly, and against the phenolic and cinnamic stabilizers of Knapp et al., U.S. Pat. No. 3,244,668 discussed in detail hereinbefore, taken singly, in combinations with each other, and with the polyphosphate employed in the instant invention. The polyphosphate and phenol of the invention used were penta-2-ethylhexyl-penta-sodium di-tripolyphosphate and 1,4-bis-(2′-hydroxy-3′-t-butyl-5′-methylphenyl) 2-butene together with its polymer which were formulated as a sample mixture for incorporation in the block copolymer. The Knapp et al. stabilizers used for purposes of comparison were 2,6-di-t-butyl-4-nitrophenol, ethyl - 4 - hydroxy - 3,5-di-t-butyl-α-cyanocinnamate and 3,5-di-tert-butyl-4-hydroxy-benzaldehyde. In each case, to obtain results based on equal stabilizer concentration, a total of 1 part of stabilizer per 100 parts of block polymer was used. Test samples were prepared as described hereinbefore. Tables II to V set out the parts of polyphosphate, phenol or combination of the stabilizers in each system per 100 parts of Thermolastic 125, 201, 202 or 226 block copolymer, and the test results obtained after oven-aging at 350° F. (Table II) and 375° F. (Tables III to V), respectively.

TABLE II.—THERMOLASTIC 125

[Oven aging at 350° F.]

| Example Number | Stabilizer system | | Amount (parts) | Resinification time (minutes) |
|---|---|---|---|---|
| Control 1 | No stabilizer | | 0 | 15–30 |
| Control 2 | Polyphosphate[penta-2-ethylhexyl-penta-sodium di-tripolyphosphate]. | | 1.0 | 60 |
| Control 3 | Polyhydric polycyclic phenol [1,4-bis(2′-hydroxy-3′-t-butyl-5′-methlphenyl)-2-butene and its polymer]. | | 1.0 | 45–60 |
| Control 4: Knapp I | 2,6-di-t-butyl-4-nitrophenol | | 1.0 | 30 |
| Control 5: Knapp II or III | Ethyl-4-hydroxy-3,5-di-t-butyl-α-cyanocinnamate | | 1.0 | 60 |
| Control 6: | | | | |
| Knapp I | 2,6-di-t-butyl-4-nitrophenol | | 0.5 | 30 |
| Knapp II or III | Ethyl-4-hydroxy-3,5-di-t-butyl-α-cyanocinnamate | | 0.5 | |
| Control 7: Knapp I | {2,6-di-t-butyl-4-nitrophenol | | 0.5 | 45 |
| | Polyphosphate | | 0.5 | |
| Control 8: Knapp II or III | {Ethyl-4-hydroxy-3,5-di-t-butyl-α-cyanocinnamate | | 0.5 | 30 |
| | Polyphosphate | | 0.5 | |
| Control 9: | | | | |
| Knapp I | 2,6-t-butyl-4-nitrophenol | | 0.25 | 45 |
| Knapp II or III | {Ethyl-4-hydroxy-3,5-di-t-butyl-α-cyanocinnamate | | 0.25 | |
| | Polyphosphate | | 0.5 | |
| Example 1 | {Polyhydric polycyclic phenol | | 0.5 | 120 |
| | Polyphosphate | | 0.5 | |

TABLE III.—THERMOLASTIC 201

[Oven aging at 375° F.]

| Example Number | Stabilizer system | Amount (parts) | Resinification time (minutes) |
|---|---|---|---|
| Control 1 | No stabilizer | 0 | 15 |
| Control 2 | Polyphosphate [penta-2-ethylhexyl-penta-sodium di-tripolyphosphate]. | 1.0 | 30 |
| Control 3 | Polyhydric polycyclic phenol [1,4-bis(2'-hydroxy-3'-t-butyl-5'-methylphenyl)-2-butene and its polymer]. | 1.0 | 30–45 |
| Control 4: Knapp I | 2,6-di-t-butyl-4-nitrophenol | 1.0 | 15–30 |
| Control 10: Knapp I' | 3,5-di-tert-butyl-4-hydroxybenzaldehyde | 1.0 | 30 |
| Control 11: Knapp II or III | Ethyl-4-hydroxy-3,5-di-t-butyl-α-cyanocinnamate | 1.0 | 15–30 |
| Control 12: | | | |
| Knapp I | 2,6-di-t-butyl-4-nitrophenol | 0.5 | 15–30 |
| Knapp II or III | Ethyl-4-hydroxy-3,5-di-t-butyl-α-cyanocinnamate | 0.5 | |
| Control 13: | | | |
| Knapp I | 2,6-di-t-butyl-4-nitrophenol | 0.5 | 15 |
| Knapp I' | 3,5-di-tert-butyl-4-hydroxybenzaldehyde | 0.5 | |
| Control 14: | | | |
| Knapp I' | 3,5-di-tert-butyl-4-hydroxybenzaldehyde | 0.5 | 30–45 |
| Knapp II or III | Ethyl-4-hydroxy-3,5-di-t-butyl-α-cyanocinnamate | 0.5 | |
| Control 7: Knapp I | {2,6-di-t-butyl-4-nitrophenol / Polyphosphate} | 0.5 / 0.5 | 30 |
| Control 15: Knapp I' | {3,5-di-tert-butyl-4-hydroxybenzaldehyde / Polyphosphate} | 0.5 / 0.5 | 30 |
| Control 16: Knapp II or III | {Ethyl-4-hydroxy-3,5-di-t-butyl-α-cyanocinnamate / Polyphosphate} | 0.5 / 0.5 | 30 |
| Control 17: | | | |
| Knapp I | 2,6-di-t-butyl-4-nitrophenol | 0.25 | 30–45 |
| Knapp I' | {3,5-di-tert-butyl-4-hydroxybenzaldehyde / Polyphosphate} | 0.25 / 0.5 | |
| Control 18: | | | |
| Knapp I | 2,6-di-t-butyl-4-nitrophenol | 0.25 | 45 |
| Knapp II or III | {Ethyl-4-hydroxy-3,5-di-t-butyl-α-cyanocinnamate / Polyphosphate} | 0.25 / 0.5 | |
| Control 19: | | | |
| Knapp I' | 3,5-di-tert-butyl-4-hydroxybenzaldehyde | 0.25 | 30 |
| Knapp II or III | {Ethyl-4-hydroxy-3,5-di-t-butyl-α-cyanocinnamate / Polyphosphate} | 0.25 / 0.5 | |
| Example 1 | {Polyhydric polycyclic phenol / Polyphosphate} | 0.5 / 0.5 | 60–75 |

TABLE IV.—THERMOLASTIC 202

[Oven aging at 375° F.]

| Example Number | Stabilizer system | Amount (parts) | Resinification time (minutes) |
|---|---|---|---|
| Control 1 | No stabilizer | 0 | 15 |
| Control 2 | Polyphosphate[penta-2-ethylhexyl-penta-sodium di-tripolyphosphate]. | 1.0 | 30 |
| Control 3 | Polyhydric polycyclic phenol [1,4-bis(2'-hydroxy-3'-t-butyl-5'-methylphenyl)-2-butene and its polymer]. | 1.0 | 45–60 |
| Control 4: Knapp I | 2,6-di-t-butyl-4-nitrophenol | 1.0 | 30 |
| Control 10: Knapp I' | 3,5-di-tert-butyl-4-hydroxybenzaldehyde | 1.0 | 30 |
| Control 11: Knapp II or III | Ethyl-4-hydroxy-3,5-di-t-butyl-α-cyanocinnamate | 1.0 | 30–45 |
| Control 12: | | | |
| Knapp I | 2,6-di-t-butyl-4-nitrophenol | 0.5 | 30 |
| Knapp II or III | Ethyl-4-hydroxy-3,5-di-t-butyl-α-cyanocinnamate | 0.5 | |
| Control 13: | | | |
| Knapp I | 2,6-di-t-butyl-4-nitrophenol | 0.5 | 30 |
| Knapp I' | 3,5-di-tert-butyl-4-hydroxybenzaldehyde | 0.5 | |
| Control 14: | | | |
| Knapp I' | 3,5-di-tert-butyl-4-hydroxybenzaldehyde | 0.5 | 45 |
| Knapp II or III | Ethyl-4-hydroxy-3,5-di-t-butyl-α-cyanocinnamate | 0.5 | |
| Control 7: Knapp I | {2,6-di-t-butyl-4-nitrophenol / Polyphosphate} | 0.5 / 0.5 | 30–45 |
| Control 15: Knapp I' | {3,5-di-tert-butyl-4-hydroxybenzaldehyde / Polyphosphate} | 0.5 / 0.5 | 30–45 |
| Control 16: Knapp II or III | {Ethyl-4-hydroxy-3,5-di-t-butyl-α-cyanocinnamate / Polyphosphate} | 0.5 / 0.5 | 30–45 |
| Control 17: | | | |
| Knapp I | 2,6-di-t-butyl-4-nitrophenol | 0.25 | 30–45 |
| Knapp I' | {3,5-di-tert-butyl-4-hydroxybenzaldehyde / Polyphosphate} | 0.25 / 0.5 | |
| Control 18: | | | |
| Knapp I | 2,6-di-t-butyl-4-nitrophenol | 0.25 | 30 |
| Knapp II or III | {Ethyl-4-hydroxy-3,5-di-t-butyl-α-cyanocinnamate / Polyphosphate} | 0.25 / 0.25 | |
| Control 19: | | | |
| Knapp I' | 3,5-di-tert-butyl-4-hydroxybenzaldehyde | 0.25 | 45 |
| Knapp II or III | {Ethyl-4-hydroxy-3,5-di-t-butyl-α-cyanocinnamate / Polyphosphate} | 0.25 / 0.5 | |
| Example 1 | {Polyhydric polycyclic phenol / Polyphosphate} | 0.5 / 0.5 | 90 |

TABLE V.—THERMOLASTIC 226

[Oven aging at 375° F.]

| Example Number | Stabilizer system | Amount (parts) | Resinification time (minutes) |
|---|---|---|---|
| Control 1 | No stabilizer | 0 | 30 |
| Control 2 | Polyphosphate[penta-2-ethylhexyl-penta-sodium di-tripolyphosphate] | 1.0 | 30 |
| Control 3 | Polyhydric polycyclic phenol [1,4-bis(2'-hydroxy-3'-t-butyl-5'-methylphenyl)-2-butene and its polymer] | 1.0 | 60 |
| Control 4: Knapp I | 2,6-di-t-butyl-4-nitrophenol | 1.0 | 30 |
| Control 10: Knapp I' | 3,5-di-tert-butyl-4-hydroxybenzaldehyde | 1.0 | 30 |
| Control 11: Knapp II or III | Ethyl-4-hydroxy-3,5-di-t-butyl-α-cyanocinnamate | 1.0 | 30 |
| Control 12: | | | |
|   Knapp I | 2,6-di-t-butyl-4-nitrophenol | 0.5 | 45 |
|   Knapp II or III | Ethyl-4-hydroxy-3,5-di-t-butyl-α-cyanocinnamate | 0.5 | |
| Control 13: | | | |
|   Knapp I | 2,6-di-t-butyl-4-nitrophenol | 0.5 | 30 |
|   Knapp I' | 3,5-di-tert-butyl-4-hydroxybenzaldehyde | 0.5 | |
| Control 14: | | | |
|   Knapp I' | 3,5-di-tert-butyl-4-hydroxybenzaldehyde | 0.5 | 30 |
|   Knapp II or III | Ethyl-4-hydroxy-3,5-di-t-butyl-α-cyanocinnamate | 0.5 | |
| Control 7: Knapp I | 2,6-di-t-butyl-4-nitrophenol / Polyphosphate | 0.5 / 0.5 | 30 |
| Control 15: Knapp I' | 3,5-di-tert-butyl-4-hydroxybenzaldehyde / Polyphosphate | 0.5 / 0.5 | 30 |
| Control 16: Knapp II or III | Ethyl-4-hydroxy-3,5-di-t-butyl-α-cyanocinnamate / Polyphosphate | 0.5 / 0.5 | 30 |
| Control 17: | | | |
|   Knapp I | 2,6-di-t-butyl-4-nitrophenol | 0.25 | 30 |
|   Knapp I' | 3,5-di-tert-butyl-4-hydroxybenzaldehyde / Polyphosphate | 0.25 / 0.5 | |
| Control 18: | | | |
|   Knapp I | 2,6-di-t-butyl-4-nitrophenol | 0.25 | 30 |
|   Knapp II or III | Ethyl-4-hydroxy-3,5-di-t-butyl-α-cyanocinnamate / Polyphosphate | 0.25 / 0.5 | |
| Control 19: | | | |
|   Knapp I' | 3,5-di-tert-butyl-4-hydroxybenzaldehyde | 0.25 | 30 |
|   Knapp II or III | Ethyl-4-hydroxy-3,5-di-t-butyl-α-cyanocinnamate / Polyphosphate | 0.25 / 0.5 | |
| Example 1 | Polyhydric polycyclic phenol / Polyphosphate | 0.5 / 0.5 | >120 |

The data obtained in the oven aging tests at 350° F. and 375° F. show that the stabilizer system of the invention provides styrene-butadiene block polymer Thermolastic 125, 201, and 202 and 226 with an enhanced resistance to oxidative deterioration on heat aging over its components taken singly (Controls 2 and 3) in the same amounts.

The data obtained in the oven aging tests show that the polyphosphate-polyhydric polycyclic phenol combination employed in the instant invention are very much superior to combinations of polyphosphates and monocyclic phenols as taught by Knapp et al. U.S. Pat. No. 3,244,668 as stabilizers for general block copolymers. From Tables II to V it is seen that the monocyclic phenols of Knapp et al. in many cases actually depreciate the effectiveness of the polyphosphate rather than enhance it, as do the polyhydric poly-cyclic phenols employed in the instant invention. Control 2 in each of Tables II to V shows that the polyphosphate by itself somewhat improves the resistance of the block copolymers to oxidative deterioration. Furthermore, Controls 4, 5, 10 and 11 in each of Tables II to V show that the monocyclic phenols taught by Knapp et al. also somewhat improve the resistance of block copolymers to oxidative deterioration. Controls 6, 12, 13 and 14 in each of Tables II to V show that the Knapp et al. stabilizer combinations also somewhat improve the resistance of block copolymers to oxidative deterioration; but this improvement is not any greater than that provided by each of the Knapp et al. monocyclic phenols taken alone and the polyphosphate taken alone. As seen from Controls 7, 8, 9, 15, 16, 17, 18 and 19 in Tables II to V, a combination of one or more of the Knapp et al. monocyclic phenols with the polyphosphate produces a stabilizer combination which is substantially less effective than the polyphosphate taken alone. In fact, the stabilizer combinations of the Knapp et al. monocyclic phenols and the polyphosphate is about the average of the Knapp et al. monocyclic phenols and polyphosphates separately, and is about 25 to 50% less effective than the polyphosphate taken alone. As seen from Example 1 of the instant invention, the combination of the polyhydric polycyclic phenol and polyphosphate is about 100% more effective than polyphosphate taken alone. Thus, the polyhydric polycyclic phenol does phosphate taken alone. Thus, the polyhydric phenol does not depreciate the effectiveness of the polyphosphate as does the monocyclic phenol of Knapp et al., but rather enhances the effectiveness of the polyphosphate. Accordingly, it is apparent that the monocyclic phenols of Knapp et al. are not equivalent to the polyhydric polycyclic phenols employed in the instant invention.

Examples 2 and 3

The stabilizer system of the invention was evaluated as a stabilizer for Thermolastic 125 block copolymer employing a total of 1.0 part of stabilizer in each case. Table VI sets out the parts and type of stabilizer in each system per 100 parts Thermolastic 125 block copolymer and the test results obtained after oven aging at 375° F.

In Example 2 a homogenous blend of pentastearyl pentasodium di-tripolyphosphate and 1,4-bis (2'-hydroxy-3'-t-butyl-5'-methylphenyl)2-butene was incorporated in the block copolymer and in Example 3 a homogeneous blend of penta-iso-tridecyl pentasodium di-tripolyphosphate and 1,4-bis(2'-hydroxy-3'-t-butyl-5' - methylphenyl)2 - butene was incoporated in the block copolymer.

TABLE VI

| Stabilizer system | Control 1 | Example No. 2 | Example No. 3 |
|---|---|---|---|
| 1,4-bis(2'-hydroxy-3'-t-butyl-5'-methylphenyl)-2-butene | | 0.5 | 0.5 |
| Pentastearyl penta-sodium di-tripolyphosphate | | 0.5 | |
| Penta-iso-tridecyl pentasodium di-tripolyphosphate | | | 0.5 |
| Test results: Oven aging at 375° F | (1) | (2) | (2) |

[1] About 15 minutes.
[2] Did not resinify after 120 minutes.

The data obtained in the oven aging tests at 375° F. (Table VI) show that the stabilizer system of the invention provides Thermolastic 125 block copolymer with improved resistance to oxidative deterioration on heat aging.

Examples 4 to 7

Other stabilizer systems of the invention employing various alkyl polyphosphate salts with the same polyhydric polycyclic phenol were evaluated as stabilizers for Thermolastic 125 block copolymer employing 1.0% total stabilizer. Table VII sets out the parts and type of stabilizer in each system per 100 parts Thermolastic 125 block copoylmer.

of five 40 watt fluorescent light bulbs in an enclosed box at a distance of 6 inches from the bulbs. This test measures the influence of light exposure on the degradation of the polymer. Table IX sets out the test results for both oven aging and light stability.

TABLE IX

| Stabilizer system | Control | | | | Example | |
|---|---|---|---|---|---|---|
| | 1 | 2 | 3 | 20 | 12 | 13 |
| Penta-2-ethylhexyl pentasodium di-tripolyphosphate | | | 1.0 | | 0.5 | 0.5 |
| 1,4-bis(2-hydroxy-3'-t-butyl-5'-methylphenyl)2-butene | | | | 1.0 | 0.5 | 0.5 |
| UV 531: 2-hydroxy-4-n-octyloxy benzophenone | | | | 0.5 | 0.5 | |
| UV 326: 2(3'-test-butyl-2'-hydroxy-5-methylphenyl)-5-chlorobenzotriazole | | | | | | 0.5 |
| Test results: oven aging at— | | | | | | |
| 350° F., minutes | 45 | 60 | | 45-60 | >120 | >120 |
| 375° F., minutes | 30 | 30 | 60 | 30 | >120 | >120 |
| Light stability: | | | | | | |
| Color after 18¾ hours exposure | (1) | (1) | (3) | (1) | (1) | (1) |
| Color after 44 hours exposure | (1) | (2) | (3) | (1) | (2) | (1) |

[1] Light yellow. [2] Medium yellow. [3] Dark yellow.

TABLE VII

| Stabilizer system | Example No. | | | |
|---|---|---|---|---|
| | 4 | 5 | 6 | 7 |
| 1,4-bis(2'-hydroxy-3'-t-butyl-5'-methylphenyl)2-butene | 0.5 | 0.5 | 0.5 | 0.5 |
| Pentadodecyl-2-ethylhexyl pentazinc di-tripolyphosphate | 0.5 | | | |
| Pentadodecyl-2-ethylhexyl pentamagnesium di-tripolyphosphate | | 0.5 | | |
| Pentadodecyl-2-ethylhexyl pentanickel di-tripolyphosphate | | | 0.5 | |
| Pentadodecyl-2-ethylhexyl pentabarium di-tripolyphosphate | | | | 0.5 |

The data obtained in the oven aging tests at 350° F. showed that the stabilizer system of the invention provided Thermolastic 125 block copolymer with improved or enhanced resistance to oxidative deterioration (crazing) on heat aging and also inhibited discoloration of the polymer on heat aging.

Examples 8 to 11

Other stabilizer systems of the invention employing various polyhydric polycyclic phenols with the same alkyl polyphosphate salt were evaluated as stabilizers for Thermolatic 125 block copolymer and Table VIII sets out the test result obtained after oven aging at 375° F.

TABLE VIII

| Stabilizer system | Control 1 | Example No. | | | |
|---|---|---|---|---|---|
| | | 8 | 9 | 10 | 11 |
| Penta-2-ethylhexyl pentasodium di-tripolyphosphate | 0.5 | 0.5 | 0.5 | 0.5 | 0.5 |
| 1,1,3-tris(2'-methyl-4'-hydroxy-5'-t-butylphenyl)butane (Topanol CA) | | 0.5 | | | |
| 4,4'-thiobis(2'-t-butyl-5'methylpnenol) (Santonox R) | | | 0.5 | | |
| Irganox 858 | | | | 0.5 | |
| Irganox 1010 | | | | | 0.5 |
| Test results: Oven aging at 375° F., minutes | 15 | (1) | 30-45 | 45 | 45 |

[1] About 60 minutes.

Irganox 858 employed in Example 10 is 2,4-bis(3,5-di - tert - butyl - 4 - hydroxyphenoxy) - 6 - ( - n - octylthio)-1,3,5-triazine. Irganox 1010 employed in Example 11 is pentaerythritol tetra(3,5-di-tert-butyl-4-hydroxyphenylpropionate).

The data obtained in the oven aging test at 375° F. show that the stabilizer system of the invention provides Thermolastic 125 block copolymer with an enhanced resistance to crazing upon being exposed to elevated temperatures. Furthermore, the stabilizer combination inhibited discoloration of the polymer on heat aging.

Examples 12 and 13

Stabilizer systems of the invention incorporating in addition a light stabilizer were evaluated as stabilizers for Thermolastic 226 block copolymer. In addition to oven aging at 350 and 375° F., the block copolymer containing these stabilizer systems were exposed to a bank The data obtained in the oven tests at 350° F. and 375° F. show that the stabilizer system of the invention including light stabilizer provided Thermolastic 226 block copolymer with improved or enhanced resistance to oxidative deterioration (crazing) and increased resistance to discoloration due to exposure to light.

Having regard to the foregoing disclosure, the following is claimed as the inventive and patentable embodiments thereof:

1. A block copolymer composition having enhanced resistance to deterioration when heated at 350° F. consisting essentially of a block copolymer comprising: (a) a non-elastomeric polymer block comprising a polymerized alpha-olefin having an average molecular weight within the range of from about 20,000 to about 115,000 and (b) an elastomeric polymer block comprising a polymer of a conjugated diolefin having an average molecular weight within the range of from about 20,000 to about 1,000,000 and (c) a stabilizer combination consisting essentially of (i) an alkyl polyphosphate salt having the formula $M_nR_m(P_xO_{3x+1})_z$ wherein M is selected from the group consisting of monovalent and bivalent metal, ammonium, quaternary ammonium, and organic cations; R is an alkyl radical having from one to about 24 carbon atoms; $x$ is an integrar from 2 to 4; $z$ is the number of $(P_xO_{3\pm1})$ radicals, and is an integer of from 1 to $$\frac{n(\text{valence of metal}) + m}{\text{valence of polyphosphate group}}$$

$n$ is the number of M cations, and is an integer from 1 to $$\frac{z(\text{valence of polyphosphate group}) - m}{\text{valence of metal}}$$

and $m$ is the number of R groups, and is an integer from 1 to $z(\text{valence of polyphosphate group}) - n(\text{valence of metal})$ and the total of $n+m$ is taken to satisfy the total valence of the $z(P_xO_{3x+1})$ radicals; and (ii) a polyhydric polycyclic phenol having from 12 to about 300 carbon atoms and having the formula:

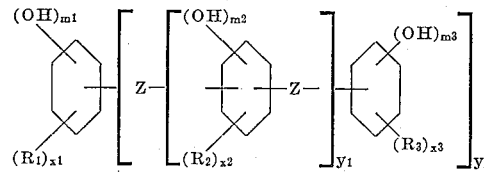

wherein $R_1$, $R_2$, and $R_3$ are inert substituents selected from the group consisting of hydrogen, halogen, and organic radicals containing from one to about 30 carbon atoms selected from the group consisting of alkyl, aryl, alkenyl, alkaryl, aralkyl, cycloalkenyl, cycloakyl, alkoxy, aryloxy, acyl, carboxyl, and thiosydrocarbon groups; Z is selected from the group consisting of oxygen, sulfur, alkylene, alkenylene, alicyclene, arylene, and mixed alkylene-arylene and alkylene-alicyclene groups; $m_1$ and $m_3$ are integers from 1 to 5; $m_2$ is an integer from 1 to 4; $x_1$ and $x_3$ are integers from 0 to 4; $x_2$ is an integer from 0 to 3; $y_1$ is an integer from 0 to 6; and $y_2$ is an integer from 1 to 5; said polyphosphate salt being present in an amount sufficient to enhance the stabilizing effectiveness of the phenol.

2. A composition in accordance with claim 1, wherein the alkyl polyphosphate salt is an alkali metal salt.

3. A composition in accordance with claim 1, wherein the alkyl polyphosphate is an alkaline earth metal salt.

4. A composition in accordance with claim 1, wherein the alkyl polyphosphate salt is an ammonium salt.

5. A composition in accordance with claim 1, wherein the alkyl polyphosphate salt is an amine salt.

6. A composition in accordance with claim 1, wherein the alkyl polyphosphate salt is a cadmium salt.

7. A composition in accordance with claim 1, wherein the alkyl polyphosphate salt is a nickel salt.

8. A composition in accordance with claim 1 wherein the alkyl polyphosphate salt is a zinc salt.

9. A composition in accordance with claim 1, wherein Z is sulfur.

10. A composition in accordance with claim 1, wherein Z is alkylene.

11. A composition in accordance with claim 1, wherein Z is alkenylene.

12. A composition in accordance with claim 1, wherein $R_1$, $R_2$ and $R_3$ are alkyl substituents.

13. A block copolymer composition in accordance with claim 1, including in addition an organic phosphite.

14. A block copolymer composition in accordance with claim 1, wherein the block copolymer comprises a non-elastomeric polymer block comprising a polymerized alkenyl cyclohydrocarbon and an elastomeric block comprising a conjugated diene polymer block.

15. A block copolymer composition in accordance with claim 1, wherein the copolymer is hydrogenated sufficiently to reduce its unsaturation to less than 3% of the original value.

References Cited

UNITED STATES PATENTS 3,472,813   10/1969   Hecker et al. _____ 260—45.75

JOSEPH L. SCHOFER, Primary Examiner

J. C. HAIGHT, Assistant Examiner

U.S. Cl. X.R.

252—400; 260—23, 32.8, 33.4, 37, 45.75, 880

UNITED STATES PATENT OFFICE
CERTIFICATE OF CORRECTION

Patent No. 3,520,952　　　　　　　　Dated　July 21, 1970

Inventor(s) Arthur C. Hecker and Charles Abramoff

It is certified that error appears in the above-identified patent and that said Letters Patent are hereby corrected as shown below:

In Column 3, line 11, "stablizers" should be --stabilizers--; line 24, "stabiilzers" should be --stabilizers--; line 29, "1115,000" should be --115,000--; line 36, "polyphosphonate" should be --polyphosphate--; lines 41-42, "polyphosphonate" should be --polyphosphate--; line 45, "polyphosphonate" should be --polyphosphate--. Column 4, line 5, "valance" should be --valence--. Column 5, line 15, "tripolyphasphate" should be --tripolyphosphate--. Column 6, line 11, "$C_{19}$" should be --$C_{18}$--; lines 54-55, after "resulting", please insert --in--; line 72, "titated" should be --titrated--. Column 7, line 13, "trihydrocarbon" should be --thiohydrocarbon--; line 50, last formula, that portion of the formula reading

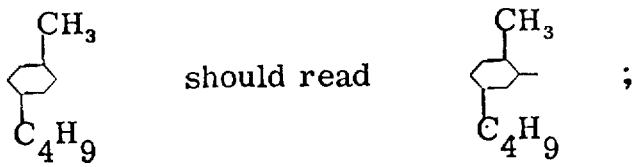

Column 8, lines 7 to 11, that portion of the formula reading

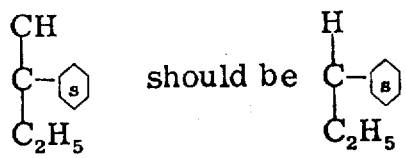

line 21, "hypdrogen" should be --hydrogen--; lines 49 to 54, second formula, that portion of the formula reading

UNITED STATES PATENT OFFICE
CERTIFICATE OF CORRECTION

Patent No. 3,520,952    Dated July 21, 1970

Inventor(s) Arthur C. Hecker and Charles Abramoff

It is certified that error appears in the above-identified patent and that said Letters Patent are hereby corrected as shown below:

Column 9, lines 24 and 25, that portion of the formula reading

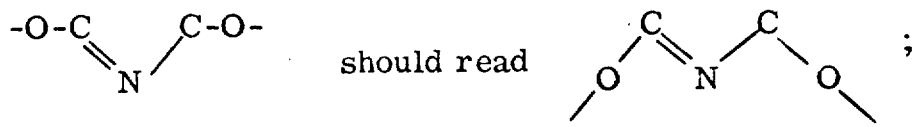

line 26, please insert the following formula

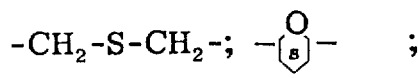

line 45, after "benzyl", please insert --)--. Column 10, line 3, "pentaerylthritoltetra" should be --pentaerythritoltetra--; line 9, after "phenyl", please insert --)--; line 70, "latext" should be --latex--. Column 11, line 15, "Fllers" should be --Fillers--. Column 15-16, Table III, Control 7, Knapp I, "polyp osphate" should be --polyphosphate--;

. Column 18, lines 34 and 35, please delete "Thus, the polyhydric polycyclic phenol does phosphate taken alone."; line 35, after "polyhydric", please insert --polycyclic--. Column 19, lines 42 and 43, "Thermolatic" should be --Thermolastic--. Column 20, Table IX, line 6, "test" should be --tert--; Table IX, Control 2, line 12, "(1)" should be --(2)--; line 21, after "oven", please insert --aging--; line 35, "20,000" should be --2000--; line 44, "integrar" should be --integer--; line 45, the formula reading "$(P_xO_{3+1})$" should read --$(P_{3x+1})$--; line 73, "cycloakyl" should be --cycloalkyl--; line 74, "Thiosydrocarbon" should be --thiohydrocarbon--.

SIGNED AND
SEALED
NOV 24 1970

(SEAL)
Attest:

Edward M. Fletcher, Jr.
Attesting Officer

WILLIAM E. SCHUYLER, JR.
Commissioner of Patents